(12) United States Patent
Huang et al.

(10) Patent No.: US 11,979,436 B2
(45) Date of Patent: May 7, 2024

(54) COMMUNICATION METHOD AND APPARATUS

(71) Applicant: Huawei Technologies Co., Ltd., Shenzhen (CN)

(72) Inventors: Zexu Huang, Dongguan (CN); Guojun Wu, Beijing (CN); Fan Yang, Shanghai (CN); Wenge Zhang, Dongguan (CN); Tao Qian, Shanghai (CN); Ridong Xu, Dongguan (CN); Shubing Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/854,521

(22) Filed: Jun. 30, 2022

(65) Prior Publication Data

US 2022/0337637 A1 Oct. 20, 2022

Related U.S. Application Data

(63) Continuation of application No. PCT/CN2020/140975, filed on Dec. 29, 2020.

(30) Foreign Application Priority Data

Dec. 31, 2019 (CN) .......................... 201911417937.8

(51) Int. Cl.
*H04L 65/1069* (2022.01)
*H04L 65/1016* (2022.01)

(52) U.S. Cl.
CPC ...... *H04L 65/1069* (2013.01); *H04L 65/1016* (2013.01)

(58) Field of Classification Search
CPC ..... H04L 4/08; H04W 8/08; H04W 28/0268; H04W 36/0022; H04W 48/02;
(Continued)

(56) References Cited

U.S. PATENT DOCUMENTS 8,743,696 B2 * 6/2014 Chowdhury .......... H04L 45/306
370/237
8,831,014 B2 * 9/2014 Koodli ................ H04L 12/1485
370/401
(Continued)

FOREIGN PATENT DOCUMENTS

CN 103069857 A 4/2013
CN 103856968 A 6/2014
(Continued)

OTHER PUBLICATIONS

Sandvine Incorporated, "Discussion on UPF architecture and interconnection to PCF, SMF," SA WG2 Meeting SA2#120, S2-171671, Mar. 27-31, 2017, Busan, Korea (Republic Of), 21 pages.
(Continued)

*Primary Examiner* — Dustin Nguyen
(74) *Attorney, Agent, or Firm* — Conley Rose, P.C.

(57) ABSTRACT

A communication method comprises that if a policy control device does not support setup of an Internet Protocol (IP) multimedia subsystem (IMS) default bearer during setup of an IMS default bearer for a terminal, the control plane gateway sends second indication information to a user plane gateway, where the second indication information indicates the control plane gateway bypasses the policy control device. When the user plane gateway receives an IMS session request from the terminal and determines that the control plane gateway bypasses the policy control device, the user plane gateway sends first indication information to the control plane gateway, and the first indication information indicates the control plane gateway to send, to the policy control device, a first request to request to establish a mapping relationship between the terminal and the control plane gateway such that an IMS session can be set up between terminals.

20 Claims, 9 Drawing Sheets

(58) Field of Classification Search
CPC ....... H04W 4/46; H04W 48/06; H04M 15/66; H04M 15/8214; H04L 65/1083; H04L 12/1485; H04L 45/306; H04L 61/5014
See application file for complete search history.

(56) References Cited

U.S. PATENT DOCUMENTS

| | | | |
|---|---|---|---|
| 9,191,265 B1* | 11/2015 | McGinn | H04L 65/1083 |
| 11,463,929 B2* | 10/2022 | Kim | H04W 36/0022 |
| 2013/0294327 A1 | 11/2013 | Horn et al. | |
| 2015/0081903 A1* | 3/2015 | Molinero Fernandez | H04M 15/66 709/225 |
| 2015/0382142 A1 | 12/2015 | Kim et al. | |
| 2016/0227467 A1* | 8/2016 | Tomici | H04W 48/06 |
| 2017/0079081 A1 | 3/2017 | Kim et al. | |
| 2017/0126618 A1* | 5/2017 | Bhaskaran | H04L 61/5014 |
| 2017/0208634 A1 | 7/2017 | Bharatia et al. | |
| 2018/0007521 A1* | 1/2018 | Meredith | H04W 4/46 |
| 2019/0297538 A1* | 9/2019 | Keller | H04W 36/0022 |
| 2020/0162862 A1* | 5/2020 | Munoz-Sanchez | H04M 15/8214 |
| 2020/0252849 A1* | 8/2020 | Tang | H04W 8/08 |
| 2020/0323008 A1* | 10/2020 | Pal | H04W 36/0022 |
| 2020/0404739 A1* | 12/2020 | Thiebaut | H04W 4/08 |
| 2021/0014741 A1* | 1/2021 | Hallenstål | H04W 48/02 |
| 2022/0022089 A1* | 1/2022 | Zhu | H04W 28/0268 |

FOREIGN PATENT DOCUMENTS

| | | |
|---|---|---|
| CN | 104272669 A | 1/2015 |
| CN | 105027633 A | 11/2015 |
| CN | 105764082 A | 7/2016 |
| CN | 106134281 A | 11/2016 |
| CN | 108632944 A | 10/2018 |
| CN | 110048873 A | 7/2019 |
| EP | 1887740 A1 | 2/2008 |
| WO | 2018224126 A1 | 12/2018 |

OTHER PUBLICATIONS

Ma Jinlan et al., "IMS Network Bypass Technology and Its Application Research", Mobile Communications, Issue 06, 2011, with an English abstract, 8 pages.

3GPP TS 23.228 V15.4.0 (Mar. 2019)3rd Generation Partnership Project;Technical Specification Group Services and System Aspects; IP Multimedia Subsystem (IMS);Stage 2(Release 15), 330 pages.

* cited by examiner

COMMUNICATION METHOD AND APPARATUS

CROSS-REFERENCE TO RELATED APPLICATIONS

This is a continuation of International Patent Application No. PCT/CN2020/140975 filed on Dec. 29, 2020, which claims priority to Chinese Patent Application No. 201911417937.8 filed on Dec. 31, 2019. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

After a terminal is powered on, the terminal may initiate an attach procedure to a core network device through an access network device, and further set up an Internet Protocol (IP) multimedia subsystem (IMS) default bearer, for example, an IMS voice bearer. When the IMS default bearer is set up, the core network device selects a control plane gateway, and the control plane gateway sends a request message to a policy control device, where the request message is used to request to set up a mapping relationship between an IP address of the terminal and an identifier of the control plane gateway, to subsequently find the control plane gateway using the IP address of the terminal.

After setup of the IMS default bearer for the terminal, a calling/called terminal may initiate a call procedure. For example, the calling terminal sends an IMS session request to the called terminal through a user plane gateway, a proxy call session device, or the like. After receiving a response fed back by the called terminal, the proxy call session device may send the IP address of the terminal to the policy control device. Further, the policy control device may find a corresponding control plane gateway using the IP address of the terminal, to set up an IMS session.

Both the policy control device and the control plane gateway that are described above are located in a data center. Generally, a large quantity of terminals are attached to one data center. When a fault occurs in one data center, terminals attached to the data center need to be re-attached to a network of another data center. In this case, a plurality of terminals initiate attachment and set up IMS default bearers in batches. A device other than a control plane gateway in the data center, for example, a policy control device, reserves a limited resource for setting up the IMS default bearer for the terminal. When a plurality of terminals set up IMS default bearers in batches, the policy control device is easily overwhelmed, and cannot normally set up a mapping relationship between an IP address of a terminal and an identifier of the control plane gateway. In this way, an IMS session cannot be normally set up between terminals.

SUMMARY

Embodiments of this application provide a communication method and apparatus, to resolve a current problem that an IMS session cannot be normally set up between terminals after setup of an IMS default bearer fails.

According to a first aspect, a communication method is provided. A user plane gateway may receive an IMS session request from a first terminal, and the first terminal may be a calling terminal, or may be a called terminal. The user plane gateway may determine whether a control plane gateway bypasses a policy control device in a process of setting up an IMS default bearer for the first terminal, in other words, whether the policy control device sets up a mapping relationship between the first terminal and the control plane gateway. If the user plane gateway determines that the control plane gateway bypasses the policy control device, the user plane gateway may send first indication information for the first terminal to the control plane gateway, where the first indication information is used to indicate the control plane to send a first request to the policy control device, and the first request is used to request to establish a mapping relationship between the first terminal and the control plane gateway.

In this embodiment, if the user plane gateway determines that the control plane gateway bypasses the policy control device, the user plane gateway indicates the control plane gateway to send the first request to the policy control device, to establish the mapping relationship between the first terminal and the control plane gateway. In this way, the policy control device may establish the mapping relationship between the first terminal and the control plane gateway such that an IMS session is normally set up between the first terminal and a second terminal.

In a possible implementation, when the first terminal is a calling terminal, the user plane gateway may further send an IMS session request to the second terminal after the user plane gateway receives the IMS session request from the first terminal, where the second terminal is a called terminal.

In a possible implementation, when the first terminal is a called terminal, the user plane gateway may further send an IMS session request to the first terminal.

In a possible implementation, when the user plane gateway determines whether the control plane gateway bypasses the policy control device, the user plane gateway may determine whether second indication information sent by the control plane gateway is received, where the second indication information is used to indicate that the control plane gateway bypasses the policy control device in the process of setting up the IMS default bearer for the first terminal. If the user plane gateway determines that the second indication information sent by the control plane gateway is received, the user plane gateway may determine that the control plane gateway bypasses the policy control device.

After bypassing the policy control device, the control plane gateway sends the second indication information to the user plane gateway. In this way, the user plane device may determine, based on whether the second indication information is received, whether to bypass the policy control device.

In a possible implementation, after the user plane gateway receives the IMS session request from the first terminal, if the user plane gateway determines that the control plane gateway does not bypass the policy control device in the process of setting up the IMS default bearer for the first terminal, the use plane gateway may send an IMS default request to the second terminal, and further, sending the first indication information to the control plane gateway may be omitted.

According to a second aspect, a communication method is provided. A control plane gateway may receive first indication information that is sent by a user plane gateway and that is for a terminal, where the first indication information is used to indicate the control plane gateway to send a first request to a policy control device, the first request is used to request to establish a mapping relationship between the terminal and the control plane gateway. Next, the control plane gateway sends the first request to the policy control device.

In this embodiment, the control plane gateway sends the first request to the policy control device based on the indication of the user plane gateway, and the policy control device may establish a mapping relationship between a first terminal and the control plane gateway such that an IMS session is normally established between the first terminal and a second terminal.

In a possible implementation, the control plane gateway may determine whether the policy control device supports setup of the IMS default bearer during setup of an IMS default bearer for the terminal. If the control plane gateway determines that the policy control device does not support setup of the IMS default bearer, the control plane gateway may send second indication information to the user plane gateway, where the second indication information is used to indicate that the control plane gateway bypasses the policy control device in a process of setting up the IMS default bearer for the terminal.

When determining that the policy control device does not support setup of the IMS default bearer, the control plane gateway may bypass the policy control device, and then send the second indication information to the user plane gateway. In this way, the user plane device may determine, based on whether the second indication information is received, whether to bypass the policy control device.

In a possible implementation, when the control plane gateway determines whether the policy control device supports setup of the IMS default bearer, the control plane gateway may determine whether the policy control device is overloaded or faulty. When determining that the policy control device is overloaded or faulty, the control plane gateway may determine that the policy control device does not support setup of the IMS default bearer.

In a possible implementation, the control plane gateway may send the first request to the policy control device through a binding support function device. For example, the control plane gateway sends the first request to the binding support function device, to enable the binding support function device to forward the first request to the policy control device. The example may be applied to, for example, a fourth-generation (4G) network architecture.

In a possible implementation, the control plane gateway sends the first request to the policy control device. Correspondingly, after receiving the first request sent by the control plane gateway, the policy control device may further send a second request to the binding support function device, where the second request is used to request to establish a mapping relationship between the terminal and the policy control device. The example may be applied to, for example, a fifth-generation (5G) network architecture.

According to a third aspect, a communication apparatus is provided, where the communication has a function of implementing the first aspect and any possible implementation of the first aspect. These functions may be implemented by hardware, or may be implemented by hardware executing corresponding software. The hardware or software includes one or more function modules corresponding to the foregoing functions.

According to a fourth aspect, a communication apparatus is provided, where the communication has a function of implementing the second aspect and any possible implementation of the second aspect. These functions may be implemented by hardware, or may be implemented by hardware executing corresponding software. The hardware or software includes one or more function modules corresponding to the foregoing functions.

According to a fifth aspect, a communication apparatus is provided, where the apparatus may be the user plane gateway in the foregoing method embodiments, or a chip disposed in the user plane gateway. The apparatus includes a transceiver and a processor, and optionally, further includes a memory. The memory is configured to store a computer program or instructions. The processor is separately coupled to the memory and the transceiver. When the processor executes the computer program or the instructions, the apparatus is enabled to perform, using the transceiver, the method that is in the first aspect and any possible implementation of the first aspect and that is performed by the user plane gateway.

According to a sixth aspect, a communication apparatus is provided, where the apparatus may be the control plane gateway in the foregoing method embodiments, or a chip disposed in the control plane gateway. The apparatus includes a transceiver and a processor, and optionally, further includes a memory. The memory is configured to store a computer program or instructions. The processor is separately coupled to the memory and the transceiver. When the processor executes the computer program or the instructions, the apparatus is enabled to perform, using the transceiver, the method that is in the second aspect and any possible implementation of the second aspect and that is performed by the control plane gateway.

According to a seventh aspect, a computer program product is provided, where the computer program product includes computer program code. When the computer program code is run on a computer, the computer is enabled to perform the method that is in the first aspect and any possible implementation of the first aspect and that is performed by the user plane gateway.

According to an eighth aspect, a computer program product is provided, where the computer program product includes computer program code. When the computer program code is run on a computer, the computer is enabled to perform the method that is in the second aspect and any possible implementation of the second aspect and that is performed by the control plane gateway.

According to a ninth aspect, this application provides a chip system, where the chip system includes a processor and a memory. The processor and the memory are electrically coupled, the memory is configured to store computer program instructions; the processor is configured to execute some or all of the computer program instructions that are in the memory, and when the some or all of the computer program instructions are executed, the processor is configured to implement a function of the user plane gateway in the method that is in the first aspect and any possible implementation of the first aspect.

In a possible design, the chip system may further include a transceiver. The transceiver is configured to send a signal processed by the processor, or receive a signal input to the processor. The chip system may include a chip, or may include a chip and another discrete component.

According to a tenth aspect, this application provides a chip system, where the chip system includes a processor and a memory. The processor and the memory are electrically coupled, the memory is configured to store computer program instructions; the processor is configured to execute some or all of the computer program instructions that are in the memory, and when the some or all of the computer program instructions are executed, the processor is configured to implement a function of the control plane gateway in the method that is in the second aspect and any possible implementation of the second aspect.

In a possible design, the chip system may further include a transceiver. The transceiver is configured to send a signal processed by the processor, or receive a signal input to the processor. The chip system may include a chip, or may include a chip and another discrete component.

According to an eleventh aspect, a computer-readable storage medium is provided, where the computer-readable storage medium stores a computer program. When the computer program is run, the method that is in the first aspect and any possible implementation of the first aspect and that is performed by the user plane gateway is performed.

According to a twelfth aspect, a computer-readable storage medium is provided, where the computer-readable storage medium stores a computer program. When the computer program is run, the method that is in the first aspect and any possible implementation of the first aspect and that is performed by the control plane gateway is performed.

According to a thirteenth aspect, a communication system is provided. The system includes the user plane gateway that performs the method in the first aspect and any possible implementation of the first aspect, and the control plane gateway that performs the method in the second aspect and any possible implementation of the second aspect.

DESCRIPTION OF EMBODIMENTS

The following describes embodiments of this application in detail with reference to the accompanying drawings.

Embodiments of this application provide a communication method and apparatus, where the method and the apparatus are based on a same technical concept. Because problem-resolving principles of the method and the apparatus are similar, mutual reference may be made between implementation of the apparatus and implementation of the method. Repeated description is not provided herein again.

The technical solutions in embodiments of this application may be applied to various communication systems, for example, a Long-Term Evolution (LTE) system, a Worldwide Interoperability for Microwave Access (WiMAX) communication system, a, 5G system, such as a New Radio (NR) access technology, and a future communication system.

Figure 1:
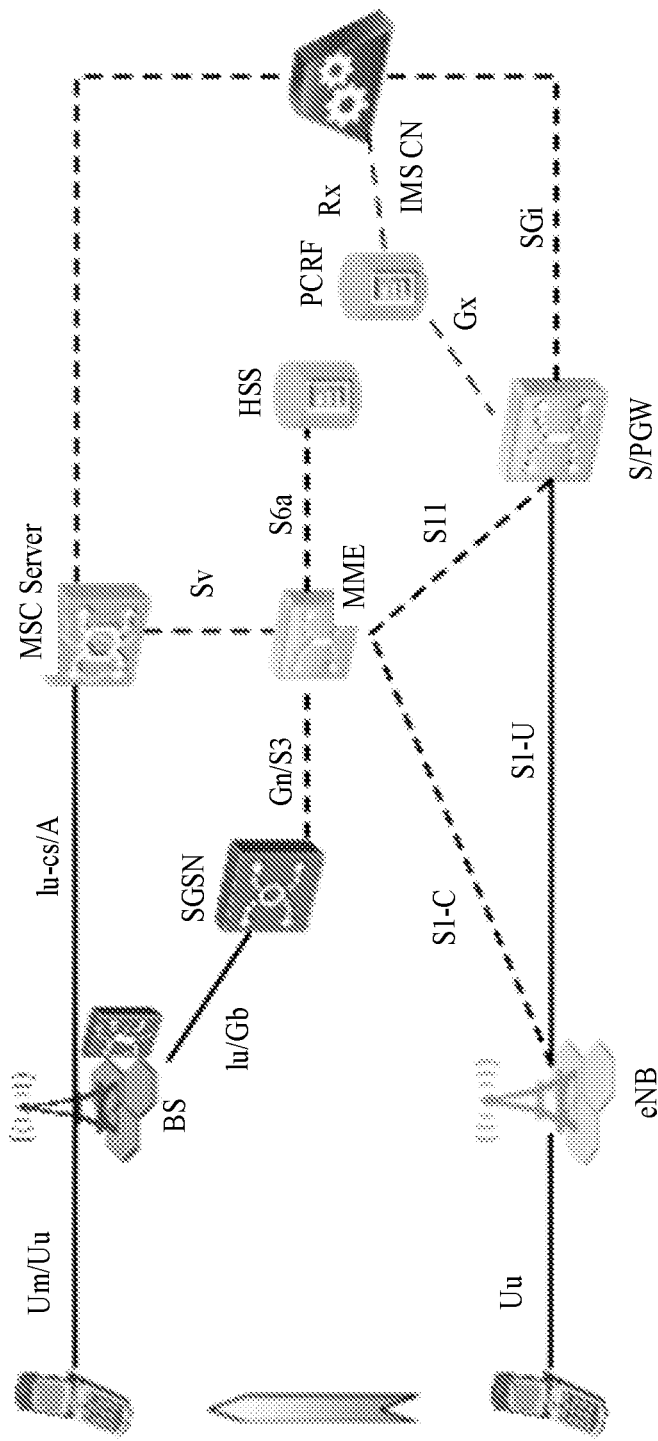
FIG. 1 and FIG. 2 are schematic diagrams of a communication architecture according to an embodiment of this application.

FIG. 1 is a schematic diagram of a possible architecture of a communication system to which this application is applicable. The communication system includes a terminal device, an evolved NodeB (eNB), a mobility management entity (MME) device, a serving gateway (SGW) device, a packet data network gateway (PGW) device, a policy and charging rules function (PCRF) device, an home subscriber server (HSS) device, a serving general packet radio service (GPRS) Support Node (SGSN) device, and a mobile switching centre (MSC) device. For logical device functions of the SGW and the PGW, a control plane function and a user plane function may be separated. Therefore, the SGW device and the PGW device may be split into SGW-C, SGW-U, PGW-C, and PGW-U. The device may alternatively be referred to as a network element. In the network architecture, an S1-C interface is a signaling plane interface between the eNodeB and the MME, an S1-U interface is a user plane interface between the eNodeB and the SGW, an S11 interface is an interface between the MME and the SGW, an S6a interface is a signaling interface between the MME and the HSS, a Gx interface is a signaling plane interface between the PGW and the PCRF, and an Rx interface is a signaling plane interface between the proxy call session control function (P-CSCF) and the PCRF.

Figure 2:
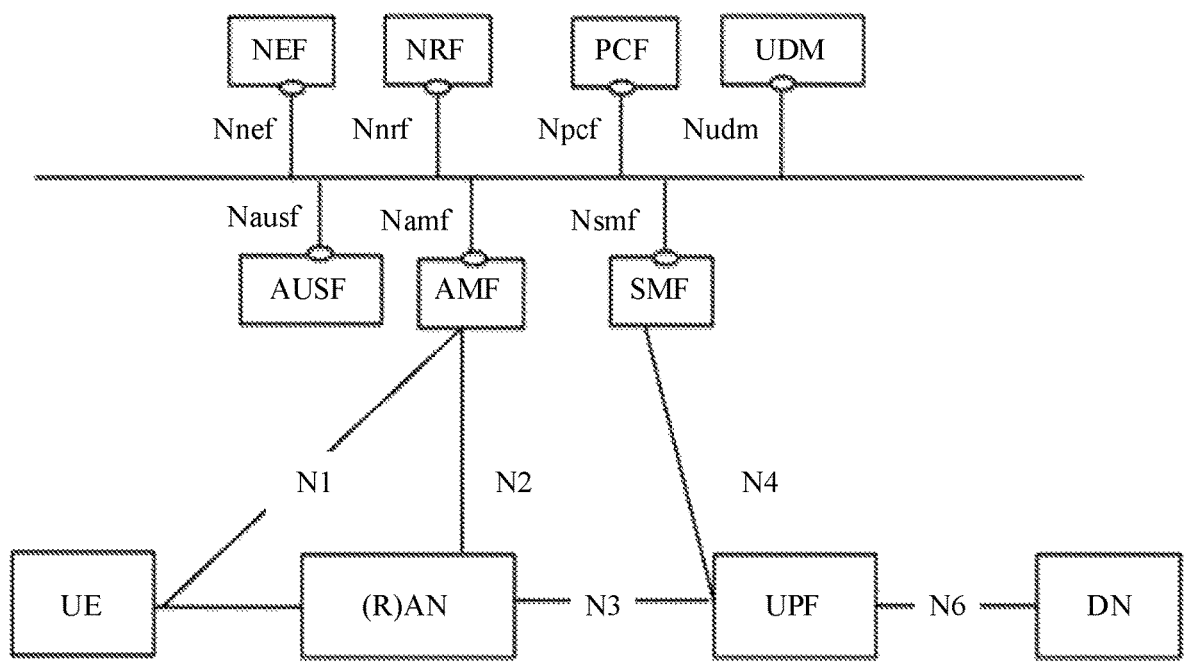

FIG. 2 is a schematic diagram of another possible architecture of a communication system to which this application is applicable. The communication system includes a terminal device, an (radio) access network ((R)AN) device, a user plane function (UPF) device, a data network (DN) device, an authentication server function (AUSF) device, an access and mobility management function (AMF) device, a session management function (SMF) device, an network exposure function (NEF) device, a network repository function (NRF) device, a policy control function (PCF) device, and a unified data management (UDM) device. The device may alternatively be referred to as a network element. In the network architecture, Nausf is a service-based interface presented by the AUSF, Namf is a service-based interface presented by the AMF, Nsmf is a service-based interface presented by the SMF, and Nnef is a service-based interface presented by the NEF, Nnrf is a service-based interface presented by the NRF, Npcf is a service-based interface presented by the PCF, and Nudm is a service-based interface presented by the UDM. N1 is a reference point between the UE and the AMF 1, N2 is a reference point between the (R)AN and the AMF, and is used to send a non-access stratum message and the like, N3 is a reference point between the (R)AN and the UPF, and is used to transmit user plane data and the like, N4 is a reference point between the SMF and the UPF, and is used to transmit information such as tunnel identification information of an N3 connection, data buffering indication information, and downlink data notification information, and an N6 interface is a reference point between the UPF and the DN, and is used to transmit user plane data and the like. The terminal is connected to the (R)AN (mainly referring to a base station) through a Uu interface. Control plane data and user plane data may be transmitted between the terminal and the base station. The control plane data is exchanged using the Radio Resource Control (RRC) protocol, and the user plane data may be exchanged using the packet data convergence protocol (PDCP).

The PGW-C device, the PGW-U device, the PCRF device, and the MME device in the 4G communication system shown in FIG. 1 may be mapped to the 5G communication system shown in FIG. 2. For example, the PGW-C device is mapped to the SMF, the PGW-U device is mapped to the UPF, the PCRF is mapped to the PCF, and the MME is mapped to the AMF.

The following describes functions of the devices in FIG. 2.

The UPF device is used for packet routing and forwarding, quality of service (QoS) processing of user plane data, and the like.

The DN device is used to provide a network for data transmission.

The AUSF device is used to implement authentication on a user, and the like.

The SMF device is mainly used for session management, IP address allocation and management of a terminal device, selection of a manageable user plane function, serving as a termination point of a policy control and charging function interface, downlink data notification, and the like.

The NEF device is used to securely expose, to the outside, a service, a capability, and the like that are provided by a Third Generation Partnership Project (3GPP) network function device.

The PCF device is a unified policy framework used to guide a network behavior, and provides policy rule information and the like for a control plane function device (such as the AMF device or the SMF device).

The application function (AF) device is a device used to manage a terminal and store attribute information of the managed terminal, for example, location information and a type that are of the terminal.

The UDM device is used for processing a user identifier, access authentication, registration, mobility management, and the like.

The NRF device is used to store information about a network function deployed in a core network, and provide discovery of a network function, a service, and the like.

It should be understood that the foregoing network architecture applied to embodiments of this application is merely a network architecture that is described from a perspective of a service-based architecture and that is used as an example. A network architecture applicable to embodiments of this application is not limited thereto. Any network architecture that can implement functions of the foregoing devices is applicable to embodiments of this application.

For ease of understanding embodiments of this application, the following describes an application scenario of this application. A service scenario described in embodiments of this application is intended to describe the technical solutions in embodiments of this application more clearly, but does not constitute a limitation on the technical solutions provided in embodiments of this application. A person of ordinary skill in the art may learn that as a new service scenario emerges, the technical solutions provided in embodiments of this application are also applicable to a similar technical problem.

The following describes an application scenario of this application using the 4G network architecture shown in FIG. 1 and the 5G network architecture shown in FIG. 2 as examples. The following application scenario is also applicable to another network architecture.

A plurality of devices, such as a control plane gateway and a policy control device, may be deployed in a data center (DC). Optionally, a mobility management device, a binding supporting function device, and the like may be further deployed. The communication system may further include a user plane gateway, an access network device, and a proxy call device. The proxy call device may be deployed in the data center, or may not be deployed in the data center.

Figure 3A:
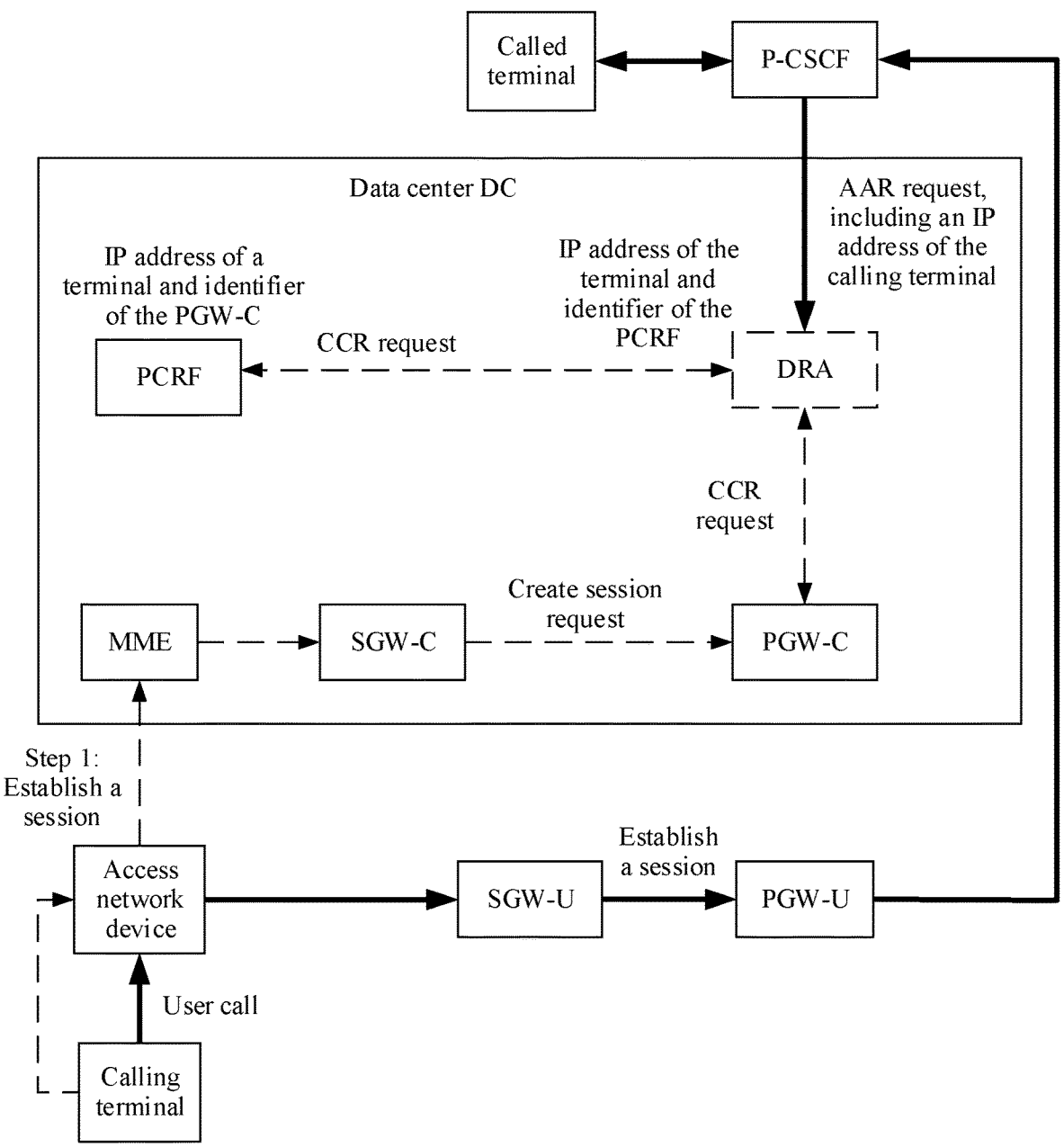
FIG. 3A, FIG. 3B, and FIG. 4 are schematic diagrams of an application scenario according to an embodiment of this application.

In the communication system shown in FIG. 3A, in the 4G network architecture, a control plane gateway may include a public data network gateway for control plane PGW-C, and optionally, may further include a serving gateway for control plane SGW-C. A policy control device may be a PCRF device, a mobility management device may be an MME device, and a creation binding support function (BSF) device may be a DRA device. A user plane gateway may include a serving gateway for user plane SGW-U and a public data network gateway for user plane PGW-U.

Figure 3B:
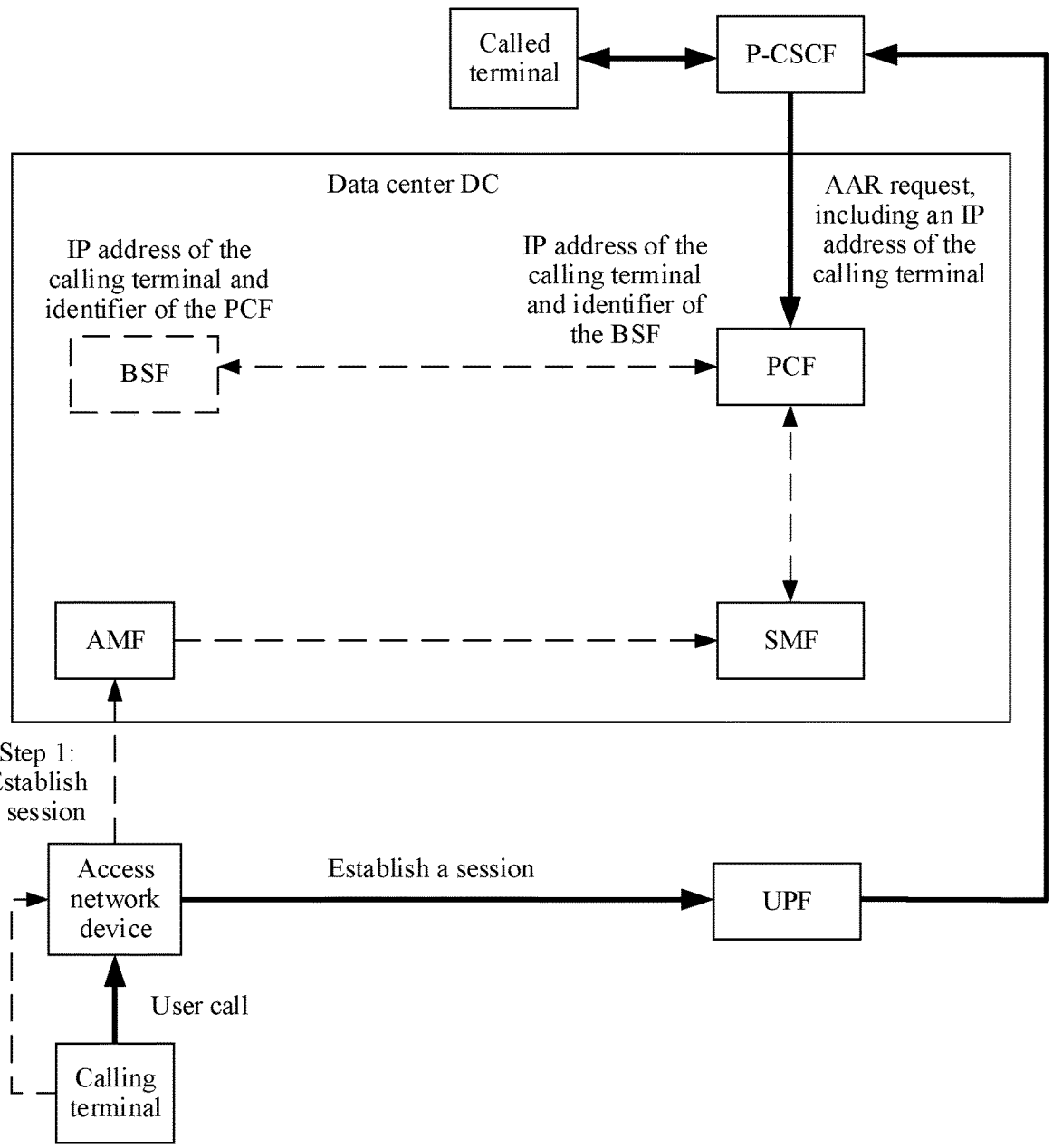

In the communication system shown in FIG. 3B, in the 5G network architecture, a control plane gateway may be an SMF device, a policy control device may be a PCF device, a mobility management device may be an AMF device, a creation binding support function device may be a BSF device, and a user plane gateway may be a UPF device.

The proxy call device may be a session border controller (SBC) device or one function module thereof, or may be a P-CSCF device.

After being powered on, a terminal may initiate an attach procedure to a core network device through the access network device. The attaching may also be referred to as setting up a default bearer for data. For example, in the 4G network architecture, the terminal initiates an evolved packet core (EPC) (4G core network) attach procedure to the MME device. For example, in the 5G network architecture, the terminal initiates a registration procedure and a protocol data unit (PDU) session establishment procedure to the AMF device.

After the attaching succeeds (that is, the terminal receives a response indicating that the attaching succeeds), if a user of the terminal is IMS user, the terminal may further set up an IMS default bearer, for example, an IMS voice bearer. The core network device may select a control plane gateway for the terminal to set up the IMS default bearer. For example, in the 4G network architecture, the MME device selects a PGW-C for the terminal to set up an IMS default bearer. For another example, in the 5G network architecture, the AMF device selects the SMF device for the terminal to set up an IMS default bearer.

For a process of setting up the IMS default bearer for the terminal, refer to the following step 1 and step 2.

Step 1: The terminal initiates a session establishment procedure to the control plane gateway through the access network device and the core network device.

In the 4G network architecture, as shown in FIG. 3A, the terminal initiates a session establishment procedure to the MME device through the access network device. The MME device sends a create session request to the public data network gateway for control plane PGW-C through the serving gateway for control plane SGW-C.

In the 5G network architecture, as shown in FIG. 3B, the terminal initiates a session establishment procedure to the AMF device through the access network device. The AMF device sends a session create request message to the SMF.

For example, the AMF device sends an SMF Nsmf PDUSession CreateSMContext Request request message to the SMF.

Step 2: After receiving the session establishment request initiated by the terminal, the control plane gateway sends a first request to the policy control device, where the first request is used to request to establish a mapping relationship between the terminal and the control plane gateway. For example, the policy control device is requested to save a mapping relationship between an IP address of the terminal and an identifier of the control plane gateway.

In the 4G network architecture, as shown in FIG. 3A, after receiving the create session request, the PGW-C may initiate an IP-connectivity access network (CAN) session establishment procedure. When no diameter routing agent (DRA) device is deployed, the PGW-C sends a credit control request (CCR) to the PCRF device, where the credit control request carries the IP address of the terminal. When a DRA device is deployed, the PGW-C sends a credit control request (CCR) to the PCRF device through the DRA device, where the credit control request carries the IP address of the terminal. After the IP-CAN session is successfully established, the PCRF device may store a mapping relationship between the IP address of the terminal and an identifier of the PGW-C, to help subsequently search for the PGW-C using the IP address of the terminal. In addition, the DRA device may store a mapping relationship between the IP address of the terminal and an identifier of the PCRF device, to help subsequently search for the PCRF using the IP address of the terminal.

In the 5G network architecture, as shown in FIG. 3B, after receiving a create session request, the SMF device may initiate a session establishment procedure. When no BSF device is deployed, the SMF device sends a session management policy establishment message to the PCF device, where the message carries the IP address of the terminal. The PCF device may store a mapping relationship between the IP address of the terminal and an identifier of the SMF device. When a BSF device is deployed, the PCF device selects a BSF device and invokes the Nbsf Management Register service operation of the BSF to send a POST request message to the BSF, where the POST request message carries the IP address of the terminal. In this case, the BSF device may store a mapping relationship between the IP address of the terminal and an identifier of the PCF device. The PCF device may select the BSF device based on the IP address of the terminal and an IP segment that is supported by the BSF. A specific selection process is not described in detail.

After the terminal establishes the IMS default bearer, the terminal may initiate an IMS call procedure. An example in which a calling terminal initiates an IMS call to a called terminal is used for description. For a specific process, refer to the following step 3 to step 6.

Step 3: The calling terminal may send an IMS session request to the user plane gateway through the access network device.

In the 4G network architecture, as shown in FIG. 3A, the calling terminal may send an invite request of the session initiation protocol (SIP) to the public data network gateway for user plane PGW-U sequentially through the access network device and the serving gateway for user plane SGW-U.

In the 5G network architecture, as shown in FIG. 3B, the calling terminal may send the invite request of SIP to the UPF device through the access network device.

Step 4: The user plane gateway may notify the called terminal of the IMS session request through the proxy call device.

In the 4G network architecture, as shown in FIG. 3A, the PGW-U may notify the called terminal of the invite request of SIP through the P-CSCF device.

In the 5G network architecture, as shown in FIG. 3B, the UPF device may notify the called terminal of the invite request of SIP through the P-CSCF device.

Step 5: After receiving a response of the called terminal, the proxy call device sends a request message that carries the IP address of the calling terminal to the policy control device, to request to establish an IMS session between the calling terminal and the called terminal.

An authentication authorization request (AAR) includes the IP address of the terminal. Further, the policy control device may find a corresponding control plane gateway using the IP address of the terminal, to set up the IMS session.

In the 4G network architecture, as shown in FIG. 3A, after the P-CSCF device receives the response fed back by the called terminal, if no DRA device is deployed, the P-CSCF device may directly send the AAR to the PCRF device, where the IP address of the calling terminal is included in the authentication authorization request. The PCRF device may find a corresponding PGW-C using the IP address of the calling terminal. If a DRA device is deployed, the P-CSCF device may send the authentication authorization request AAR to the DRA device. Further, the DRA device may find a corresponding PCRF device using the IP address of the terminal. Further, the PCRF device may find a corresponding PGW-C using the IP address of the calling terminal.

In the 5G network architecture, as shown in FIG. 3B, after the P-CSCF device receives the response fed back by the called terminal, if no BSF device is deployed, the P-CSCF device may directly send the authentication authorization request AAR to the PCF device, where the IP address of the calling terminal is included in the authentication authorization request. The PCF device may find a corresponding SMF device using the IP address of the calling terminal. If a BSF device is deployed, the P-CSCF device may send the AAR to the BSF device, where the IP address of the terminal is included in the AAR. Further, the BSF device may find a corresponding PCF device using the IP address of the calling terminal. Further, the PCF device may find a corresponding SMF device using the IP address of the calling terminal.

In a process in which the called terminal calls the calling terminal, the called terminal may reach the calling terminal sequentially through the access network device, the proxy call device, and the user plane gateway that are accessed by the called terminal, and the access network device accessed by the calling terminal. A detailed process is not described again.

Figure 4:
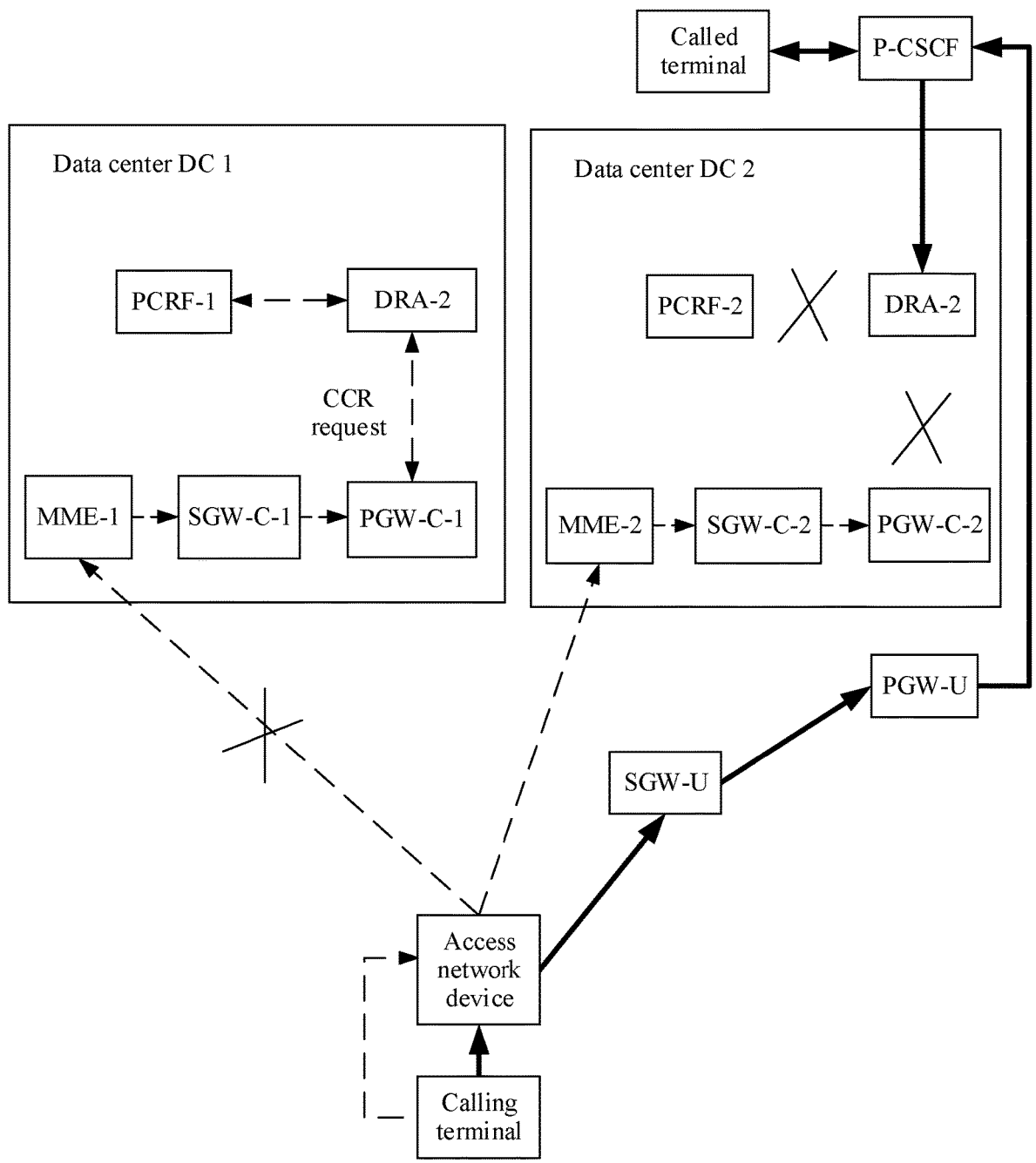

As shown in FIG. 4, in the 4G network architecture, after a DC 1 is faulty, an access network device cannot obtain a heartbeat response of a core network device (for example, MME-1). In this case, the access network device may indicate a terminal attached to the DC 1 to re-initiate an attach procedure. As shown in FIG. 4, the access network device may select a new DC 2 for attachment. It should be noted that, in FIG. 4, a PCRF, a DRA, an SGW-C, and a PGW-C that are in the DC 1 and a PCRF, a DRA, an SGW-C, and a PGW-C that are in the DC 2 have a disaster recovery and backup relationship. The PCRF is used as an example. Data stored in PCRF-1 and PCRF-2 is the same. When PCRF-1 is faulty, PCRF-2 can bear all services on the faulty PCRF-1. The same applies to the DRA, the SGW-C, and the PGW-C.

If a large quantity of terminals are attached to the DC 1, a plurality of terminals initiate attachment in batches. Devices other than the PGW-C, such as the PCRF and the DRA, reserve limited resources for terminal attachment. These devices are prone to be overwhelmed. To prevent these devices from being overwhelmed, PGW-C-2 may use a bypass function. In other words, after PGW-C-2 detects that a device is overloaded, a request is no longer sent to the device. PGW-C-2 first processes other procedures and return an attach success message to a terminal. After a period of time, PGW-C-2 sends a request to the bypassed device to refresh the status.

In a process of establishing the IMS default bearer, if PGW-C-2 in the DC 2 finds that the PCRF-2 device is overloaded, and bypasses the PCRF-2 device and the DRA-2 device, PGW-C-2 does not initiate an IP-CAN session establishment procedure. In this case, the following problems may occur.

In a reattach process of the terminal, an IP address of the terminal may change. However, routing data stored in the DRA-2 device and PCRF-2 that are in the DC 2 is old data. In other words, an old IP address is stored. When the terminal initiates a call, an SBC device sends an AAR that carries a new IP address to DRA-2. After receiving the new IP address, DRA-2 cannot find the PCRF based on the new IP address because DRA-2 stores the old IP address. In this case, the call service fails. Even if the IP address of the terminal does not change, the AAR carries the old IP address, the DRA-2 device matches an address of PCRF-1 in the faulty DC 1, and the service fails. If DRA-2 finds the PCRF-2 device, the PCRF-2 device maps to PGW-C-1 in the faulty DC 1 based on the stored old IP address, and the service also fails.

In the 5G network architecture, the same problem occurs.

Figure 5A:
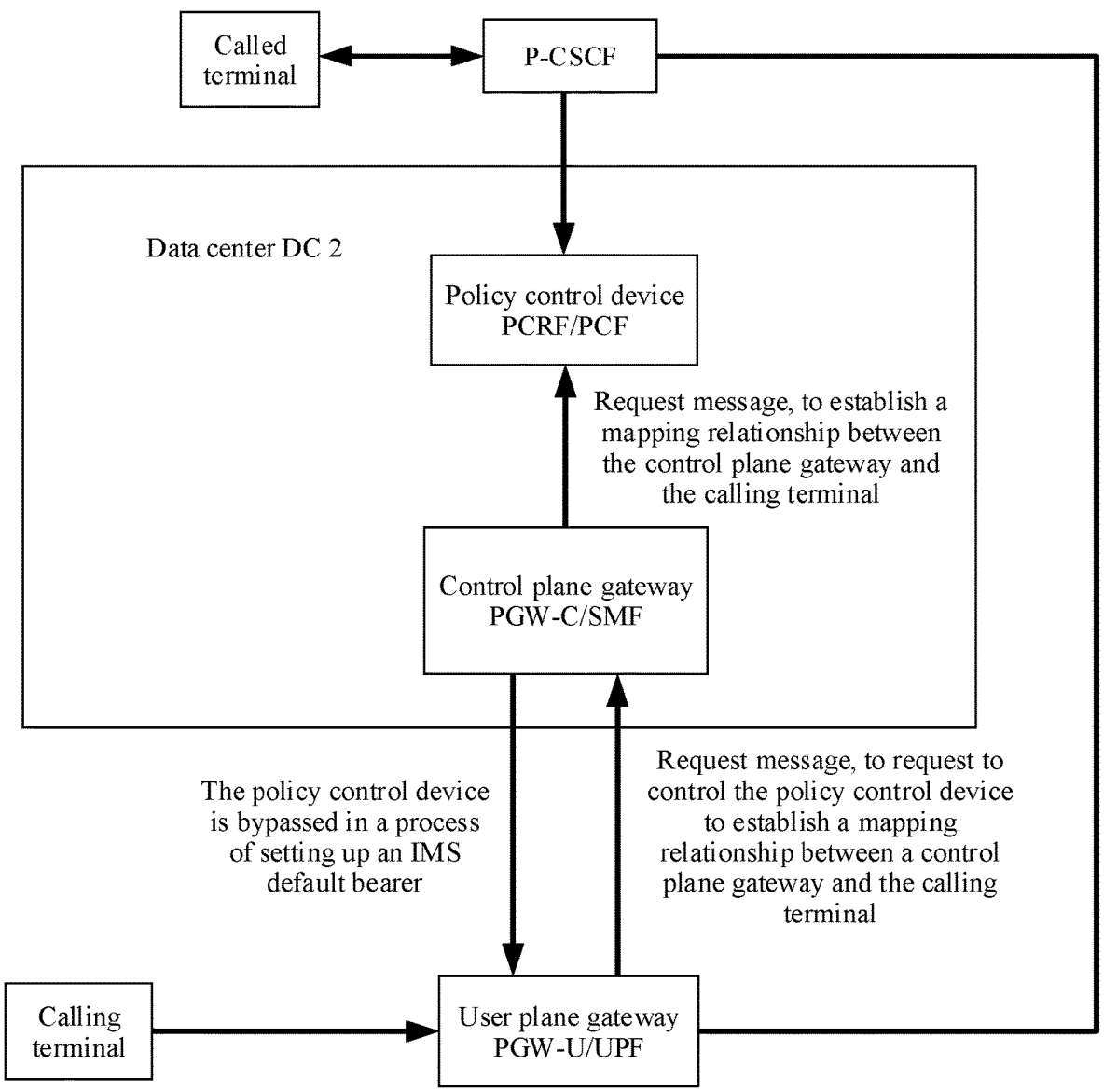
FIG. 5A and FIG. 5B are schematic diagrams of a communication process according to an embodiment of this application.

Based on this, this application provides a communication manner. As shown in FIG. 5A (repeated parts in FIG. 3A, FIG. 3B, and FIG. 4 are not described again), in a process of setting up an IMS default bearer, a control plane gateway may notify a user plane gateway of information about whether to bypass a policy control device. In this way, when receiving an IMS call of a terminal (which may be a calling terminal or a called terminal), the user plane gateway may identify whether to bypass the policy control device for the terminal. If the policy control device is bypassed in the process of setting up the IMS default bearer, the user plane gateway may send a request message to the control plane gateway, to request the policy control device to re-establish a mapping relationship between an IP address of the terminal and the control plane gateway.

For ease of understanding of embodiments of this application, the following describes some terms in embodiments of this application, to facilitate understanding of a person skilled in the art.

(1) An access network device is a device that can provide a random access function for a terminal or a chip that can be disposed in the device. The device includes but is not limited to an eNB, a base transceiver station (BTS), a home base station (for example, a home evolved NodeB, or a home NodeB (HNB)), a baseband unit (BBU), an access point (AP) in a Wi-Fi system, a wireless relay node, and a wireless backhaul node, a transmission point (TP) (transmission and reception point (TRP)), or the like. Alternatively, the device may be a next generation NodeB (gNB) or a TRP or TP that is in a 5G system, for example, an NR system, or may be one or one group (including a plurality of antenna panels) of antenna panels of a base station in a 5G system, or may be a network node forming a gNB or a transmission point, for example, a BBU or a distributed unit (DU).

(2) A terminal is also referred to as user equipment (UE), a mobile station (MS), a mobile terminal (MT), or the like, and is a device that provides voice and/or data connectivity for a user. For example, a terminal device includes a handheld device or a vehicular device that has a wireless connection function. Currently, a terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

(3) A bypass is a road, a branch line, or a branch that is separated from a main line. Different from a main loop, the bypass can switch to another loop when necessary without affecting normal running of loads.

The term "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects.

"A plurality of" in this application means two or more.

In the descriptions of this application, terms such as "first" and "second" are merely used for distinguishing and description, and cannot be understood as an indication or implication of relative importance or an indication or implication of an order.

In addition, in embodiments of this application, the word "example" is used to represent giving an example, an illustration, or a description. Any embodiment or implementation solution described as an "example" in this application should not be explained as being more preferred or having more advantages than another embodiment or implementation solution. Exactly, the word "example" is used to present a concept in a specific manner.

Figure 5B:
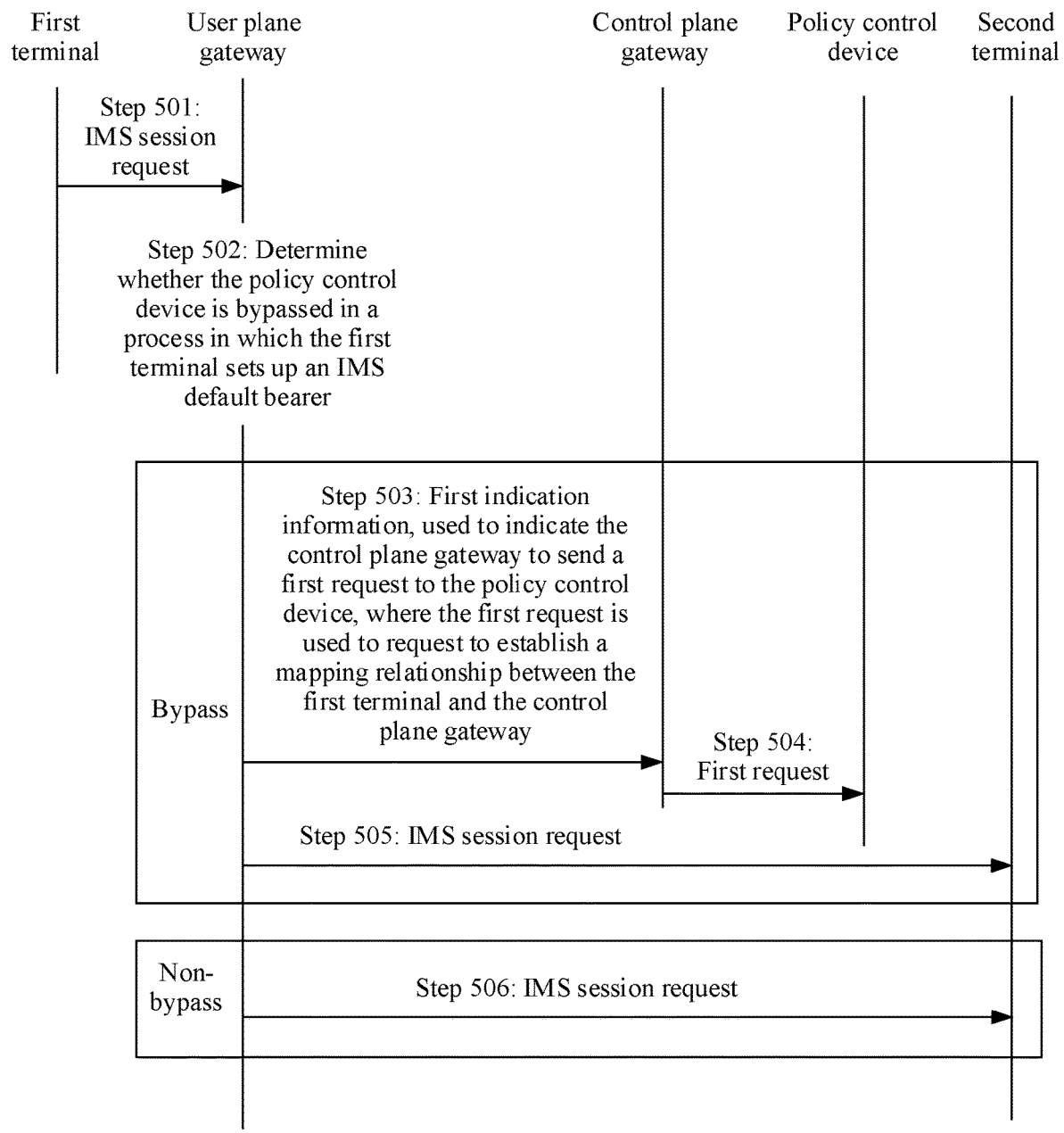

The following describes in detail the technical solutions of this application in a communication process shown in FIG. 5B.

Step 501: A user plane gateway receives an IMS session request from a first terminal.

The first terminal may be a called terminal, or may be a calling terminal.

Step 502: The user plane gateway determines whether a control plane gateway bypasses a policy control device in a process of setting up an IMS default bearer for the first terminal, and if yes, step 503 is performed, or if no, step 506 is performed.

The control plane gateway may determine whether the policy control device supports setup of the IMS default bearer during setup of the IMS default bearer for the terminal. If the policy control device does not support setup of the IMS default bearer, the control plane gateway sends second indication information to the user plane gateway, where the second indication information is used to indicate that the control plane gateway bypasses the policy control device in a process of setting up the IMS default bearer for the terminal.

For example, when the control plane gateway determines whether the policy control device supports setup of the IMS default bearer, the control plane gateway may determine whether the policy control device is overloaded or faulty. When determining that the policy control device is overloaded or faulty, the control plane gateway may determine that the policy control device does not support setup of the IMS default bearer.

For example, when the user plane gateway determines whether the control plane gateway bypasses the policy control device, the user plane gateway may determine whether second indication information sent by the control plane gateway is received, where the second indication information is used to indicate that the control plane gateway bypasses the policy control device in the process of setting up the IMS default bearer for the first terminal. If the user plane gateway determines that the second indication information sent by the control plane gateway is received, the user plane gateway may determine that the control plane gateway bypasses the policy control device.

Step 503: The user plane gateway sends first indication information for the first terminal to the control plane gateway, and correspondingly, the control plane gateway receives the first indication information that is for the terminal and that is sent by the user plane gateway, where the first indication information is used to indicate the control plane gateway to send a first request to the policy control device, and the first request is used to request to establish a mapping relationship between the first terminal and the control plane gateway.

The first request may be used to implement a binding function, such as session binding, policy and charging control (PCC) rule authorization, and QoS Flow binding. The session binding is to establish a mapping relationship between the first terminal and the control plane gateway.

Step 504: The control plane gateway sends the first request to the policy control device.

In an example, the control plane gateway may send the first request to the policy control device through a binding support function device. Further, the control plane gateway sends the first request to the binding support function device, and the first request includes identification information of the terminal, for example, an IP address of the terminal. A destination address of the first request is an address of the policy control device. The binding support function device forwards the first request to the policy control device. After receiving the first request, the policy control device may record a mapping relationship between the identification information of the terminal and identification information of the control plane gateway. In addition, the policy control device may return a response message of the first request to the control plane gateway through the binding support function device. After receiving the response message, the binding support function device may record session binding information. In other words, the binding support function device records a mapping relationship between an identifier of the policy control device and an identifier of the terminal. The example may be applied to a 4G network.

In another example, the control plane gateway sends the first request to the policy control device. Correspondingly, after receiving the first request sent by the control plane gateway, the policy control device may further send a second request to the binding support function device, where the second request is used to request to establish a mapping relationship between the terminal and the policy control device. The example may be applied to a 5G network.

Step 505: If the first terminal is a calling terminal, and the second terminal is a called terminal, the user plane gateway sends an IMS session request to the second terminal.

A sequence of step 503 and step 505 is not limited.

Step 506: If the control plane gateway does not bypass the policy control device, the user plane gateway sends an IMS session request to the second terminal.

If the first terminal is a called terminal, the user plane gateway sends an IMS session request to the first terminal.

In this embodiment, if the user plane gateway determines that the control plane gateway bypasses the policy control device, the user plane gateway indicates the control plane gateway to send the first request to the policy control device, to establish the mapping relationship between the first terminal and the control plane gateway. In this way, the policy control device may establish the mapping relationship between the first terminal and the control plane gateway such that an IMS session can be normally set up between the first terminal and the second terminal.

The foregoing describes the communication method in embodiments of this application, and the following describes a communication apparatus in embodiments of this application.

Figure 6:
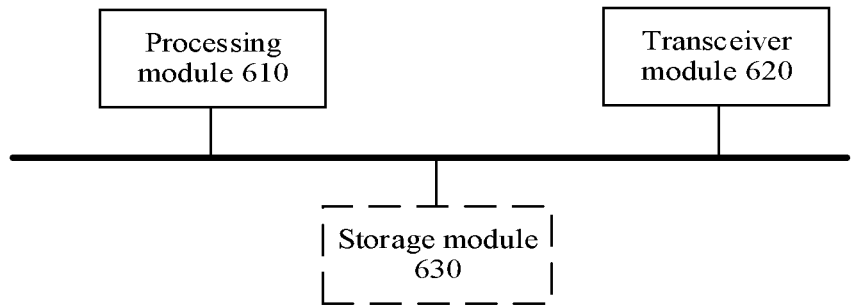
FIG. 6, FIG. 7, FIG. 8, and FIG. 9 are diagrams of a structure of a communication apparatus according to an embodiment of this application.

Based on a same technical concept as that of the foregoing communication method, as shown in FIG. 6, a communication apparatus 600 is provided. The apparatus 600 can perform the steps that are performed by the user plane gateway and that are in the method in FIG. 5A and FIG. 5B. To avoid redundancy, details are not described herein again. The apparatus 600 may be a user plane gateway, or may be a chip applied to a user plane gateway. The apparatus 600 may include a transceiver module 620 and a processing module 610. Optionally, the apparatus 600 further includes a storage module 630. The processing module 610 may be separately connected to the storage module 630 and the transceiver module 620, or the storage module 630 may be connected to the transceiver module 620.

The transceiver module 620 may be configured to receive and send data or a response.

The storage module 630 may be configured to store received data.

In an implementation, the transceiver module 620 may be configured to receive an IMS session request from a first terminal.

The processing module 610 may be configured to determine that a control plane gateway bypasses a policy control device in a process of setting up an IMS default bearer for the first terminal.

The transceiver module 620 is further configured to send first indication information for the first terminal to the control plane gateway, where the first indication information is used to indicate the control plane gateway to send a first request to the policy control device, and the first request is used to request to establish a mapping relationship between the first terminal and the control plane gateway.

Optionally, the transceiver module 620 is further configured to send an IMS session request to a second terminal. The first terminal is a calling terminal, and the second terminal is a called terminal.

Optionally, the transceiver module 620 is further configured to send an IMS session request to the first terminal, where the first terminal is a called terminal.

Optionally, when determining that the control plane gateway bypasses the policy control device in the process of setting up the IMS default bearer for the first terminal, the transceiver module 620 is further configured to determine that second indication information sent by the control plane gateway is received, where the second indication information is used to indicate that the control plane gateway bypasses the policy control device in the process of setting up the IMS default bearer for the first terminal.

Figure 7:
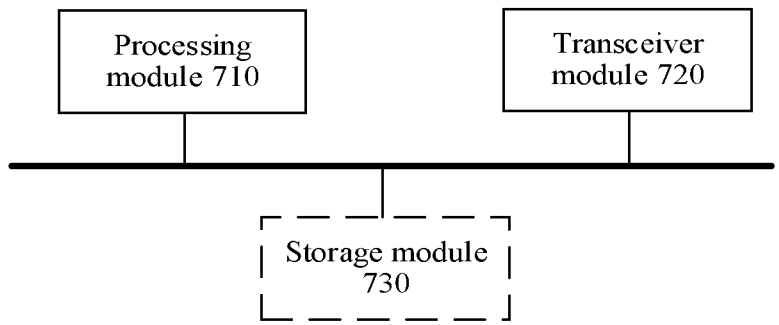

Based on a same technical concept as that of the foregoing communication method, as shown in FIG. 7, a communication apparatus 700 is provided. The apparatus 700 can perform the steps that are performed by the control plane gateway and that are in the method in FIG. 5A and FIG. 5B. To avoid redundancy, details are not described herein again. The apparatus 700 may be a control plane gateway, or may be a chip applied to a control plane gateway. The apparatus 700 may include a transceiver module 720 and a processing module 710. Optionally, the apparatus 700 further includes a storage module 730. The processing module 710 may be separately connected to the storage module 730 and the transceiver module 720, or the storage module 730 may be connected to the transceiver module 720.

The transceiver module 720 may be configured to receive and send data or a response.

The storage module 730 may be configured to store received data.

In an example, the transceiver module 720 is configured to receive first indication information that is sent by a user plane gateway and that is for a terminal, where the first indication information is used to indicate the control plane gateway to send a first request to a policy control device, the first request is used to request to establish a mapping relationship between the terminal and the control plane gateway. In addition, the transceiver module 720 sends the first request to the policy control device.

The processing module 710 is configured to determine that the policy control device does not support setup of the IMS default bearer during setup of an IMS default bearer for the terminal, and send second indication information to the user plane gateway through the transceiver module. The second indication information is used to indicate that the control plane gateway bypasses the policy control device in a process of setting up the IMS default bearer for the terminal.

Optionally, when determining that the policy control device does not support setup of the IMS default bearer, the processing module 710 is further configured to determine that the policy control device is overloaded or faulty.

Optionally, when being configured to send the first request to the policy control device, the transceiver module 720 is further configured to send the first request to the policy control device through a binding support function device.

Figure 8:
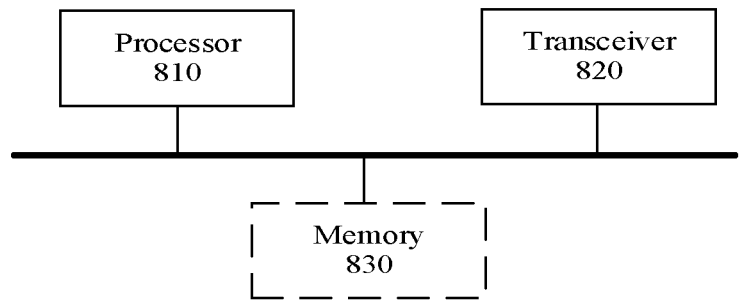

FIG. 8 is a schematic block diagram of a communication apparatus 800 according to an embodiment of this application. It should be understood that the apparatus 800 can perform the steps that are performed by the user plane gateway and that are in the methods in FIG. 5A and FIG. 5B. To avoid redundancy, details are not described herein again. The apparatus 800 includes a processor 810 and a transceiver 820. Optionally, the apparatus 800 further includes a memory 830. The processor 810 and the memory 830 are electrically coupled.

For example, the memory 830 is configured to store a computer program. The processor 810 may be configured to invoke the computer program or instructions stored in the memory, to perform the foregoing communication method using the transceiver 820.

In FIG. 6, the processing module 610 may be implemented using the processor 810, the transceiver module 620 may be implemented using the transceiver 820, and the storage module 630 may be implemented using the memory 830.

Figure 9:
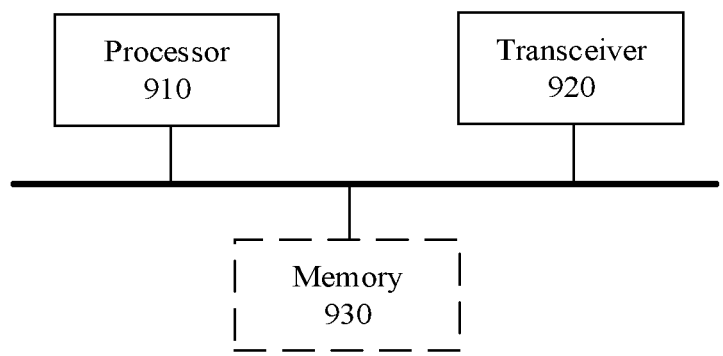

FIG. 9 is a schematic block diagram of a communication apparatus 900 according to an embodiment of this application. It should be understood that the apparatus 900 can perform the steps that are performed by the control plane gateway and that are in the methods in FIG. 5A and FIG. 5B. To avoid redundancy, details are not described herein again. The apparatus 900 includes a processor 910 and a transceiver 920. Optionally, the apparatus 900 further includes a memory 930. The processor 910 and the memory 930 are electrically coupled.

For example, the memory 930 is configured to store a computer program. The processor 910 may be configured to invoke the computer program or instructions stored in the memory, to perform the foregoing communication method using the transceiver 920.

In FIG. 7, the processing module 710 may be implemented using the processor 910, the transceiver module 720 may be implemented using the transceiver 920, and the storage module 730 may be implemented using the memory 930.

The foregoing processor may be a central processing unit (CPU), a network processor (NP), or a combination of the CPU and the NP. The processor may further include a hardware chip or another general purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or any combination thereof. The general purpose processor may be a microprocessor, or the processor may be any conventional processor, or the like.

It should be further understood that the memory mentioned in embodiments of this application may be a volatile memory or a nonvolatile memory, or may include both the volatile memory and the nonvolatile memory. The nonvolatile memory may be a read-only memory (ROM), a programmable ROM (PROM), an erasable PROM (EPROM), an electrically erasable PROM (EEPROM) or a flash memory. The volatile memory may be a random-access memory (RAM), and is used as an external cache. It is illustrated by way of example, but not limitation, that many forms of RAMs are available, such as a static random-access memory (SRAM), a dynamic random-access memory (DRAM), a synchronous DRAM (SDRAM), a double data rate (DDR) SDRAM, an enhanced SDRAM (ESDRAM), a SynchLink DRAM (SLDRAM), and a direct Rambus RAM (DRRAM). It should be noted that the memory described in this application is intended to include but is not limited to these memories and any memory of another proper type.

An embodiment of this application further provides a computer storage medium that stores a computer program. When the computer program is executed by a computer, the computer may be enabled to perform the foregoing communication method.

An embodiment of this application further provides a computer program product including instructions. When the computer program product runs on a computer, the computer may be enabled to perform the foregoing provided communication method.

An embodiment of this application further provides a communication system. The system includes a user plane gateway and a control plane gateway that perform the foregoing communication method.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc (CD)-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general purpose computer, a special purpose computer, an embedded processor, or another programmable data processing device to produce a machine such that an instruction executed by a processor of a computer or another programmable data processing device generates an apparatus for implementing a function specified in one or more processes in the flowcharts and/or one or more blocks in the block diagrams.

These computer program instructions may also be stored in a computer-readable memory capable of directing a computer or other programmable data processing device to work in a particular manner such that instructions stored in the computer-readable memory generate a manufacture including an instruction apparatus, and the instruction apparatus implements a function specified in one or more processes in the flowcharts and/or one or more blocks in the block diagrams.

These computer program instructions may also be loaded onto a computer or another programmable data processing device such that a series of operation steps are performed on the computer or the other programmable device to produce computer-implemented processing. Therefore, the instructions executed on the computer or the other programmable device provide steps for implementing functions specified in one or more processes in the flowcharts and/or one or more blocks in the block diagrams.

Although some embodiments of this application have been described, a person skilled in the art may make changes and modifications to these embodiments. Therefore, the following claims are intended to be construed as to cover the embodiments and all changes and modifications falling within the scope of this application.

Apparently, a person skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A method comprising:
   receiving, by a user plane gateway, a first Internet Protocol (IP) multimedia subsystem (IMS) session request from a first terminal;
   determining, by the user plane gateway in response to the first IMS session request, that a control plane gateway has bypassed a policy control device in a process of setting up an IMS default bearer for the first terminal; and
   sending, by the user plane gateway in response to determining that the control plane gateway has bypassed the policy control device, first indication information for the first terminal to the control plane gateway,
   wherein the first indication information indicates the control plane gateway to send a first request to the policy control device, and
   wherein the first request requests to establish a mapping relationship between the first terminal and the control plane gateway, and
   wherein the mapping relationship comprises an internet protocol (IP) address of the first terminal and an identifier of the control plane gateway.

2. The method of claim 1, further comprising sending, by the user plane gateway, a second IMS session request to a second terminal, wherein the first terminal is a calling terminal, and wherein the second terminal is a called terminal.

3. The method of claim 1, further comprising sending, by the user plane gateway, a second IMS session request to the first terminal, wherein the first terminal is a called terminal.

4. The method of claim 1, wherein determining that the control plane gateway has bypassed the policy control device comprises determining, by the user plane gateway, that second indication information has been received from the control plane gateway, and wherein the second indication information indicates that the control plane gateway has bypassed the policy control device.

5. The method of claim 1, further comprising:
   receiving, by the control plane gateway, the first indication information; and
   sending, by the control plane gateway, the first request to the policy control device.

6. The method of claim 4, further comprising:
   determining, by the control plane gateway, that the policy control device does not support setup of the IMS default bearer during setup of the IMS default bearer for the first terminal; and
   sending, by the control plane gateway in response to determining that the policy control device does not support setup of the IMS default bearer, the second indication information to the user plane gateway.

7. The method of claim 6, wherein determining that the policy control device does not support setup of the IMS default bearer comprises determining, by the control plane gateway, that the policy control device is overloaded.

8. The method of claim 5, wherein sending the first request to the policy control device comprises sending, by the control plane gateway, the first request to the policy control device through a binding support function device.

9. A communication apparatus comprising:
   a memory configured to store instructions; and
   a processor coupled to the memory and configured to:
   receive a first Internet Protocol (IP) multimedia subsystem (IMS) session request from a first terminal;
   determine, in response to the first IMS session request, that a control plane gateway has bypassed a policy control device in a process of setting up an IMS default bearer for the first terminal; and
   send, in response to determining that the control plane gateway has bypassed the policy control device, first indication information for the first terminal to the control plane gateway,
   wherein the first indication information indicates the control plane gateway to send a first request to the policy control device,
   wherein the first request requests to establish a mapping relationship between the first terminal and the control plane gateway, and
   wherein the mapping relationship comprises an internet protocol (IP) address of the first terminal and an identifier of the control plane gateway.

10. The communication apparatus of claim 9, wherein the processor is further configured to send a second IMS session request to a second terminal, wherein the first terminal is a calling terminal, and wherein the second terminal is a called terminal.

11. The communication apparatus of claim 9, wherein the processor is further configured to send a second IMS session request to the first terminal, and wherein the first terminal is a called terminal.

12. The communication apparatus of claim 9, wherein the processor is further configured to determine that second indication information has been received from the control plane gateway, and wherein the second indication information indicates that the control plane gateway has bypassed the policy control device.

13. A communication apparatus comprising:
a memory configured to store instructions; and
a processor coupled to the memory and configured to:
  determine that a policy control device does not support setup of an Internet Protocol (IP) multimedia subsystem (IMS) default bearer during setup of the IMS default bearer for a terminal;
  send, in response to determining that the policy control device does not support setup of the IMS default bearer, indication information to a user plane gateway, wherein the indication information indicates that the communication apparatus bypasses the policy control device in a process of setting up the IMS default bearer for the terminal;
  receive, for the terminal, the first indication information from the user plane gateway, wherein the first indication information indicates the communication apparatus to send a first request to the policy control device, wherein the first request requests to establish a mapping relationship between the terminal and a control plane gateway, and wherein the mapping relationship comprises an internet protocol (IP) address of the terminal and an identifier of the control plane gateway; and
  send the first request to the policy control device.

14. The communication apparatus of claim 13, wherein the processor is further configured to determine, in response determining that the policy control device does not support setup of the IMS default bearer, that the policy control device is overloaded.

15. The communication apparatus of claim 13, wherein the processor is further configured to send the first request to the policy control device through a binding support function device.

16. The communication apparatus of claim 13, wherein the processor is further configured to determine, in response to determining that the policy control device does not support setup of the IMS default bearer, that the policy control device is faulty.

17. The method of claim 1, wherein the first request comprises identification information of the first terminal.

18. The method of claim 6, wherein determining that the policy control device does not support setup of the IMS default bearer comprises determining, by the control plane gateway, that the policy control device is faulty.

19. The method of claim 8, wherein the binding support function device records a mapping relationship between an identifier of the policy control device and an identifier of the terminal.

20. The communication apparatus of claim 9, wherein the processor is further configured to:
  receive, by the control plane gateway, the first indication information; and
  send, by the control plane gateway, the first request to the policy control device.

* * * * *